US010078678B2

(12) United States Patent
Abrahams et al.

(10) Patent No.: US 10,078,678 B2
(45) Date of Patent: *Sep. 18, 2018

(54) DATA TRANSFER BETWEEN MULTIPLE DATABASES

(71) Applicant: INTERNATIONAL BUSINESS MACHINES CORPORATION, Armonk, NY (US)

(72) Inventors: Faried Abrahams, Laytonsville, MD (US); Gandhi Sivakumar, Bentleigh (AU); Lennox E. Thomas, Decatur, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/805,735

(22) Filed: Nov. 7, 2017

(65) Prior Publication Data

US 2018/0060408 A1 Mar. 1, 2018

Related U.S. Application Data

(63) Continuation of application No. 14/549,589, filed on Nov. 21, 2014, now Pat. No. 9,892,180.

(51) Int. Cl.
*G06F 17/30* (2006.01)
*G06F 11/10* (2006.01)

(52) U.S. Cl.
CPC .... *G06F 17/30575* (2013.01); *G06F 11/1004* (2013.01)

(58) Field of Classification Search
CPC ......... G06F 17/30575; G06F 17/30578; G06F 17/30581
See application file for complete search history.

(56) References Cited

U.S. PATENT DOCUMENTS 6,457,102 B1 * 9/2002 Lambright .......... G06F 12/0866
711/129
8,477,730 B2 7/2013 Rajagopalan et al.
(Continued)

OTHER PUBLICATIONS

Gao, Yu et al.; Research on Mobility Managemtn in DDQP Mechanism of SUPANET; WRI International Conference on Communications and Mobile Computing; Jan. 6-8, 2009; pp. 216-221.
(Continued)

*Primary Examiner* — Loc Tran
(74) *Attorney, Agent, or Firm* — Schmeiser, Olsen & Watts; Michael A. Petrocelli

(57) ABSTRACT

A parallel track/sector switching device and associated method is provided. The method includes identifying data replication sources and locating data replication targets associated with the data replication sources. Data replication instances associated with moving data from the data replication sources to the data replication targets are determined. A first data replication instance for moving first data from a first data replication source to a first data replication target is determined and an antenna capacity associated with the first data replication source and the first data replication target is identified. A memory to track ID map associated with a storage device of the first data replication target is identified and it is determined if a last replication slot has been allotted to the first data replication target based on the memory to track ID map.

16 Claims, 5 Drawing Sheets

(56) References Cited

U.S. PATENT DOCUMENTS

| | | |
|---|---|---|
| 2004/0196813 A1 | 10/2004 | Ofek et al. |
| 2007/0121589 A1 | 5/2007 | Guo |
| 2010/0299447 A1* | 11/2010 | Salvi .................. G06F 11/2066 709/233 |
| 2014/0281780 A1 | 9/2014 | Branscome et al. |
| 2014/0369329 A1 | 12/2014 | Lee et al. |
| 2015/0105114 A1 | 4/2015 | Chou et al. |
| 2016/0147854 A1 | 5/2016 | Abrahams et al. |

OTHER PUBLICATIONS

Gao, Yu et al.; SIP-based terminal mobility management method on DDQP of SUPANET; 2009 World Congress on Computer Science and Information Engineering; Mar. 31-Apr. 2, 2009; pp. 433-437.
Friedman, Mark; List of IBM Patents or Patent Applications Treated as Related; Nov. 7, 2017; 1 page.

* cited by examiner

| Mode | Bytes/track | Bite | LTE Advanced upload (8x8 antenna) 5mbps | Tracks per second |
|---|---|---|---|---|
| | 56,000 | 448,000 | 500000000 | 1116.071429 |
| Sequential | | | 1Gbps upload speed | LTE can transmit the above tracks in a second |
| Parallel | | | | |

300

| Tracks per minutes | Tracks per 0.05 seconds | No: of Transmitters | Tracks Model 54 |
|---|---|---|---|
| 66964.28571 | 1 | 14.67648 | 982800 |
| LTE can transmit the above tracks in a Minute sequentially | 4 | 14.67648 | |

FIG. 3

DATA TRANSFER BETWEEN MULTIPLE DATABASES

This application is a continuation application claiming priority to Ser. No. 14/549,589 filed Nov. 21, 2014.

FIELD

The present invention relates generally to a method for managing big data transmission, and in particular to a method and associated system for replicating or synchronizing data across multiple geographically dispersed databases.

BACKGROUND

Handling a large amount of information typically includes an inaccurate process with little flexibility. Transmitting information may include a complicated process that may be time consuming and require a large amount of resources. Accordingly, there exists a need in the art to overcome at least some of the deficiencies and limitations described herein above.

SUMMARY

A first aspect of the invention provides a method comprising: identifying, by a computer processor of a parallel track/sector switching device associated with big data and comprising a graphical user interface (GUI), data replication sources; locating, by the computer processor, data replication targets associated with the data replication sources; determining, by the computer processor, data replication instances associated with moving data from a first data replication source of the data replication sources to a first data replication target of the data replication targets; determining, by the computer processor, a first data replication instance of the replication instances for moving first data from the first data replication source to the first data replication target; identifying, by the computer processor based on data from a data truck, antenna capacity associated with the first data replication source and the first data replication target; identifying, by the computer processor, a transmission mode of the first data replication source; retrieving, by the computer processor, a memory to track ID map associated with a storage device of the first data replication target; and first determining, by the computer processor based on the memory to track ID map, if a replication slot has been allotted to the first data replication target.

A second aspect of the invention a parallel track/sector switching device comprising a GUI and a computer processor coupled to a computer-readable memory unit, the memory unit comprising instructions that when executed by the computer processor implements a method comprising: identifying, by the computer processor of a parallel track/sector switching device, data replication sources; locating, by the computer processor, data replication targets associated with the data replication sources; determining, by the computer processor, data replication instances associated with moving data from a first data replication source of the data replication sources to a first data replication target of the data replication targets; determining, by the computer processor, a first data replication instance of the replication instances for moving first data from the first data replication source to the first data replication target; identifying, by the computer processor based on data from a data truck, antenna capacity associated with the first data replication source and the first data replication target; identifying, by the computer processor, a transmission mode of the first data replication source; retrieving, by the computer processor, a memory to track ID map associated with a storage device of the first data replication target; and first determining, by the computer processor based on the memory to track ID map, if a replication slot has been allotted to the first data replication target.

A third aspect of the invention provides a computer program product for a parallel track/sector switching device, the computer program product comprising: one or more computer-readable, tangible storage devices; program instructions, stored on at least one of the one or more storage devices, to identify data replication sources of a big data system; program instructions, stored on at least one of the one or more storage devices, to locate data replication targets associated with the data replication sources; program instructions, stored on at least one of the one or more storage devices, to determine data replication instances associated with moving data from a first data replication source of the data replication sources to a first data replication target of the data replication targets; program instructions, stored on at least one of the one or more storage devices, to determine a first data replication instance of the replication instances for moving first data from the first data replication source to the first data replication target; program instructions, stored on at least one of the one or more storage devices, to identify based on data from a data truck, antenna capacity associated with the first data replication source and the first data replication target; program instructions, stored on at least one of the one or more storage devices, to identify a transmission mode of the first data replication source; program instructions, stored on at least one of the one or more storage devices, to identify a transmission mode of the first data replication source; program instructions, stored on at least one of the one or more storage devices, to retrieve a memory to track ID map associated with a storage device of the first data replication target; and program instructions, stored on at least one of the one or more storage devices, to first determine based on the memory to track ID map, if a last replication slot has been allotted to the first data replication target.

The present invention advantageously provides a simple method and associated system capable of determining storage issues.

BRIEF DESCRIPTION OF THE DRAWINGS

FIG. 3 illustrates a table for configuring a TS NGN switching apparatus for execution in sequential or parallel mode, in accordance with embodiments of the present invention.

DETAILED DESCRIPTION

Figure 1:
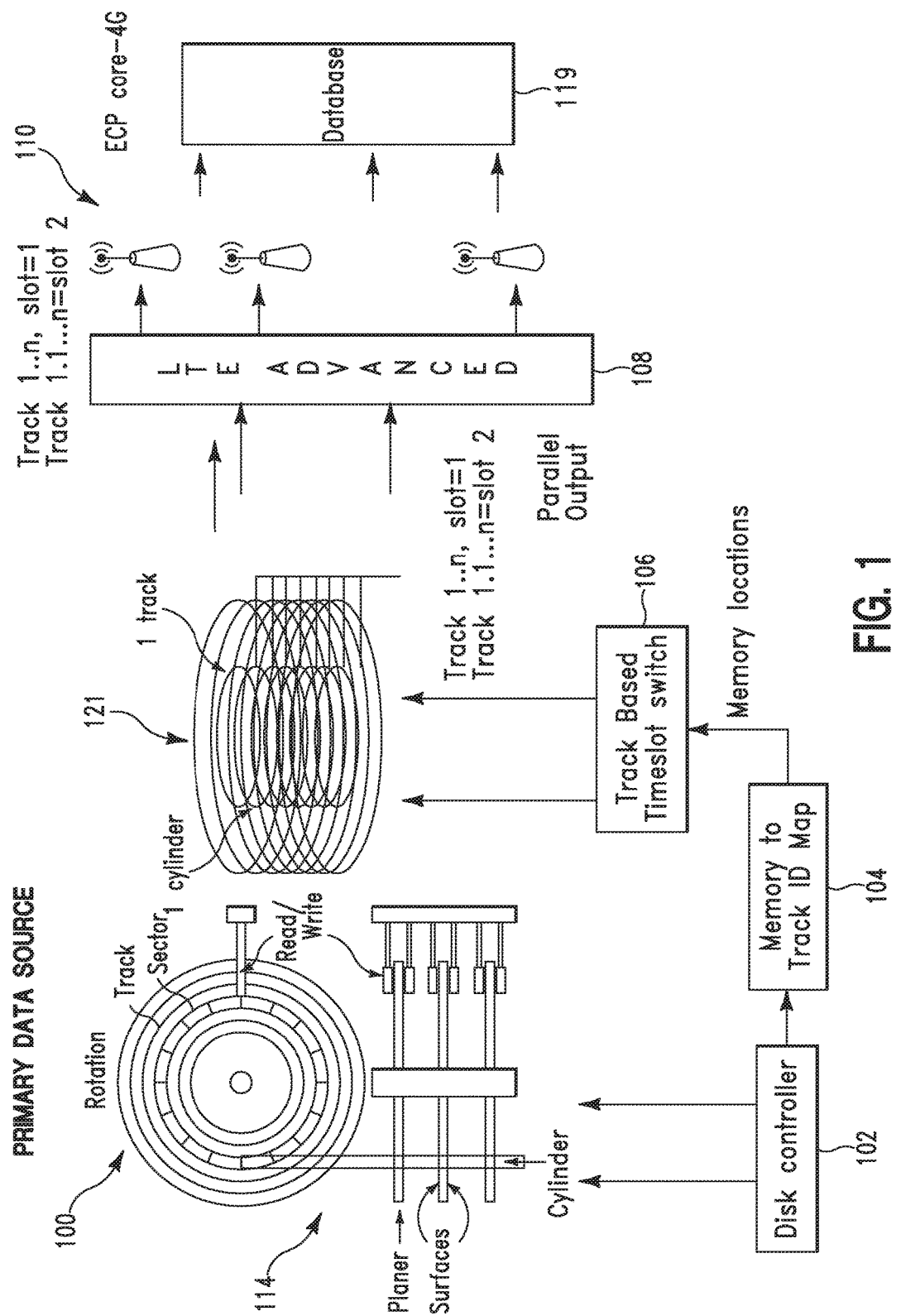
FIG. 1 illustrates a track ID switching system, in accordance with embodiments of the present invention.

FIG. 1 illustrates a track ID switching system 100, in accordance with embodiments of the present invention.

Handling a large amount of data typically comprises an extremely complex process thereby causing organizations to struggle to locate solutions from various perspectives associated with volumetrics, velocity, veracity, etc. Multiple countries comprising an unforeseen customer base associated with a volume and velocity of data may require simultaneous handling of data with respect to, inter alia, replication of data across multiple data bases dispersed geographically, extraction of data for performing transformation and load functions to one or more data targets via an intermediary hub, data synchronization, etc. Current solutions comprise a sequential process and are executed at memory address level granularity resulting in a process that is not fast enough to handle huge volumes of data with a larger velocity. Track ID switching system 100 enables a process that includes collecting parallel transfer data from various transfer points enabled at a track and sector level using track ID switching system 100 supported by various wireless and wire line technologies.

The above and other features of the present invention will become more distinct by a detailed description of embodiments shown in combination with attached drawings. Identical reference numbers represent the same or similar parts in the attached drawings of the invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Track ID switching system 100 comprises a parallel track/sector based next generation (P-TS NGN) switching apparatus 106, a disk controller 102, a memory to track ID mapping apparatus 104, and a disk system 114 connected through a data truck/transmission engine 108 and a plurality of antennas 110 to multiple databases 119. P-TS NGN switching apparatus 106 enables a process associated with a single network transporting all information and services (voice, data, media such as video, etc) by encapsulating the information and services into packets. An NGN may be constructed around the Internet Protocol. P-TS NGN switching apparatus 106 comprises a track based time slot switch enabling a process for reading a collection of tracks (e.g., tracks 121) to be replicated based upon available time slots. Disk controller 102 comprises an apparatus configured to manage a read and write process with respect to a physical memory disk 122. Memory to track ID mapping apparatus 104 identifies a memory address with track identifiers. Data truck/transmission engine 108 may include an a long term evolution (LTE) engine configured to receive data and push the data to antennas 110 (e.g., LTE antennas) for replication to databases 119.

P-TS NGN switching apparatus 106 enables a process for transferring large amounts of data at a track sector level. P-TS NGN switching apparatus 106 comprises a switching apparatus for handling of big data. Big data is defined herein as an all-encompassing term for any collection of data sets that are so large and complex that it becomes difficult to process the data using traditional data processing applications. P-TS NGN switching apparatus 106 includes a graphical user interface (GUI) for enabling the following apparatus functions:

1. Enabling a timeslot based switch that includes static and dynamic modes.
2. Providing an intelligent switch configured to learn memory to track mapping and adjust time slots accordingly.
3. Integrating with infrastructure discovery and depicting data sources/data receivers in a given ecosystem.
4. Enabling a user to set priorities.
5. Reading sector/track IDs of various sources/receivers (and/or integrating with existing utilities) and populating a memory address/trackID map.
6. Triggering a data transfer process.
7. Performing a seamless data transition process for transferring data from wireless to wire line NGN technologies.

P-TS NGN switching apparatus 106 enables processes associated with NGN technologies providing high bandwidth access speeds via fiber optics, wireless LTE, etc. P-TS NGN switching apparatus 106 is configured to access data at sector/track level at high speeds to transfer data from one or multiple sources to targets. P-TS NGN switching apparatus 106 comprises a time based switch that includes the ability to transfer data at a track/sector level enabled through next generation networks. P-TS NGN switching apparatus 106 handles data volumes with varying velocities.

Figure 2:
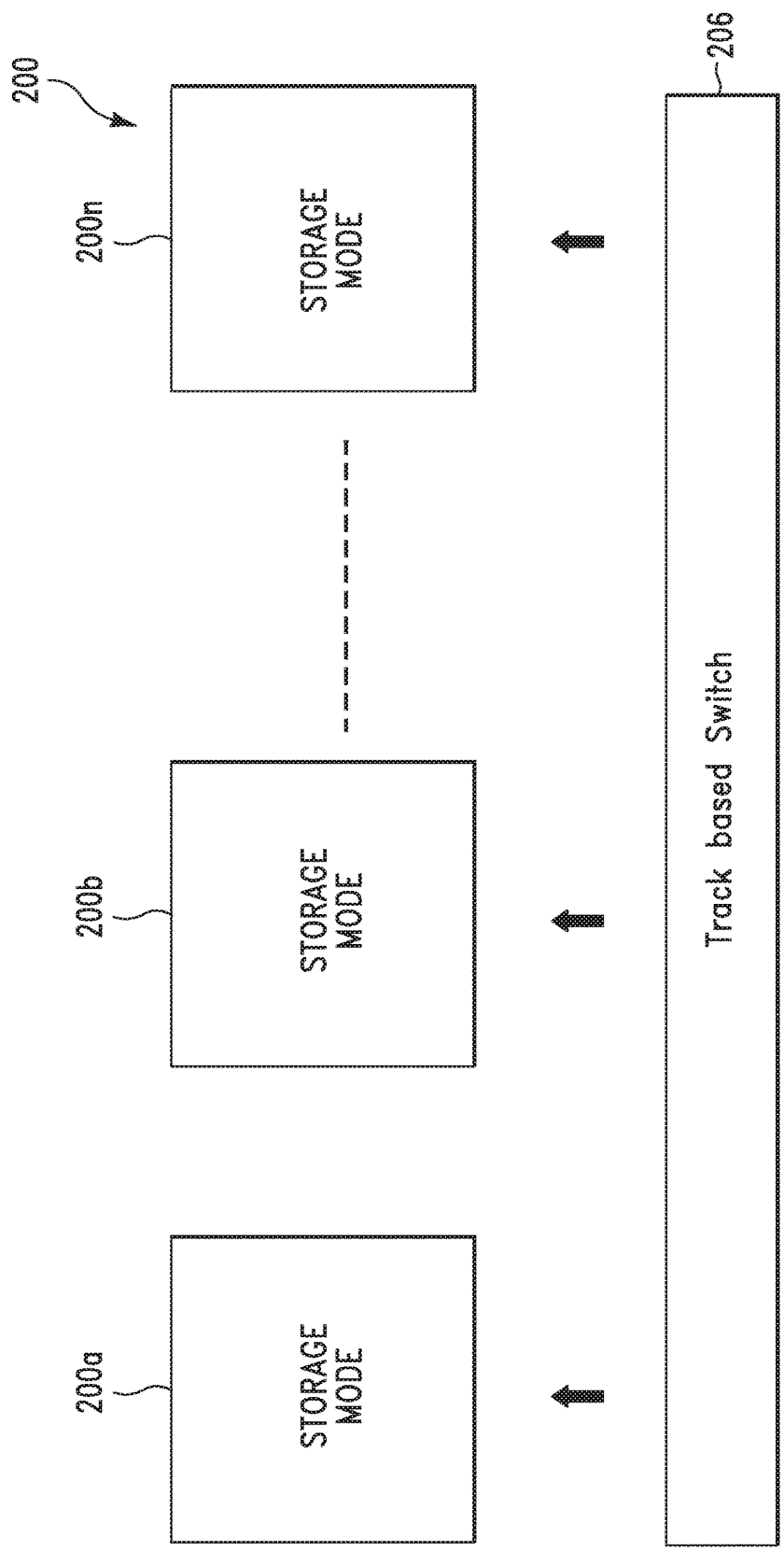
FIG. 2 illustrates storage nodes representing actual physical memory clusters, in accordance with embodiments of the present invention.

FIG. 2 illustrates storage nodes 200a . . . 200n representing actual physical memory clusters, in accordance with embodiments of the present invention. Storage nodes 200a . . . 200n are communicatively connected to a TS NGN switching apparatus 206 (as described, supra, with respect to FIG. 1). TS NGN switching apparatus 206 may comprise a $4^{th}$ generation long term evolution (4G LTE) switching device. TS NGN switching apparatus 206 may be integrated with existing discovery tools. Alternatively, TS NGN switching apparatus 206 performs a process associated with discovery of data sources and targets within an enterprise as illustrated in FIG. 2. TS NGN switching apparatus 206 integrates with a disk controller (e.g., disk controller 102 of FIG. 1) disk controller and retrieves memory to track/sector IDs. The track/sector IDs are used to populate relevant maps. TS NGN switching apparatus 206 comprises a 1200 timeslot based switch that may be configured in sequential or parallel mode.

FIG. 3 illustrates a table 300 for configuring a TS NGN switching apparatus 206 (e.g., TS NGN switching apparatus 206 of FIG. 1) for execution in sequential or parallel mode, in accordance with embodiments of the present invention. When the TS NGN switching apparatus 206 is configured for execution in sequential mode, every track/sector of a physical memory disk (e.g., TS NGN switching apparatus 206) is associated with a slot in 0.0.5 seconds and data is pushed from a source to a target. However, a sequential mode may not allow target data required for immediate processing to be immediately available as the data may not be available until the end of one minute cycle. When the TS NGN switching apparatus is configured for execution in parallel static (configuration) mode (assuming that every memory location comprises maximum storage 4 tracks), the entire data in a memory location is retrieved in 0.0.5 seconds and is available in a target. When the TS NGN switching apparatus is configured for execution in dynamic (configuration) parallel mode, the TS NGN switching apparatus reads track usage patterns from a memory track map and applies an optimal usage algorithm to set track retrieval per slot and switches between modes accordingly. For example, if a number of memory addresses use 16 tracks, the TS NGN switching apparatus switches to 16 tracks per a 0.05 second mode and transmits associated data.

Figure 4:
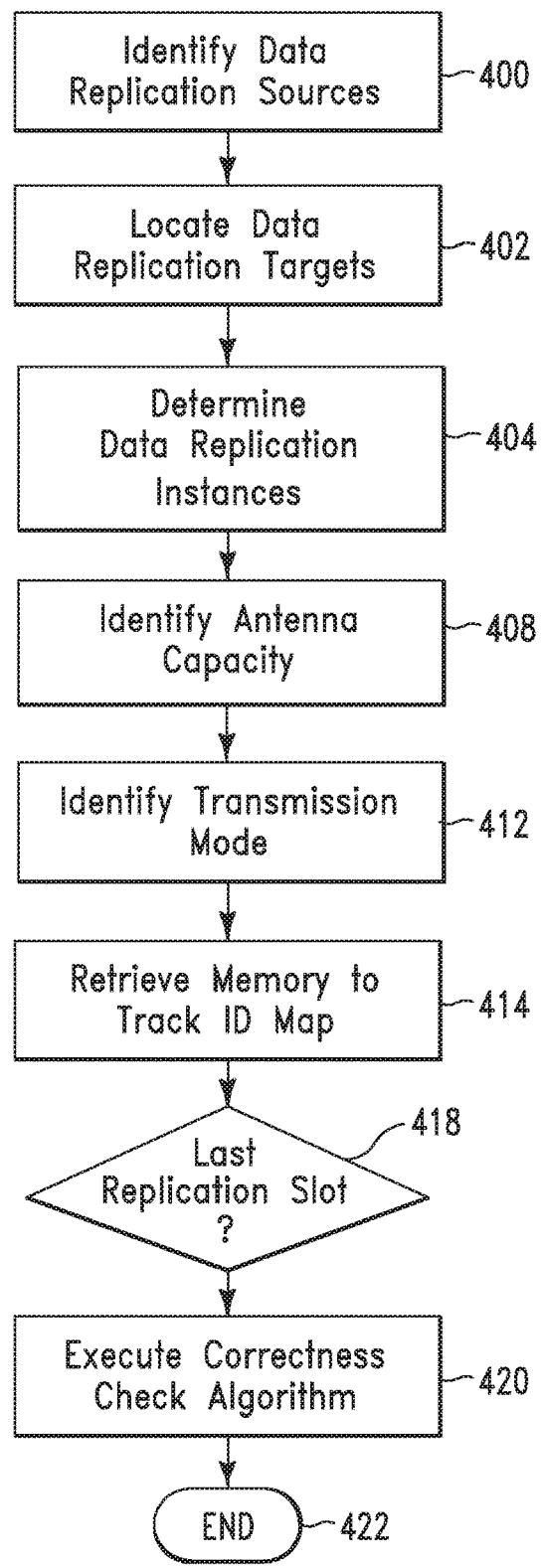
FIG. 4 illustrates an algorithm detailing a process flow executed by a track ID switching system for handling big data volumetrics, in accordance with embodiments of the present invention.

FIG. 4 illustrates an algorithm detailing a process flow executed by track ID switching system 100 of FIG. 1 for handling big data volumetrics, in accordance with embodiments of the present invention. Each of the steps in the algorithm of FIG. 4 may be enabled and executed in any order by a computer processor executing computer code. In step 400, program code identifies data replication sources. The program code is executed by a parallel track/sector switching device associated with big data and comprising a graphical user interface (GUI). A data replication source is defined herein as an entity providing data. In step 402, program code locates data replication targets associated with the data replication sources. A data replication target is defined herein as an entity receiving data. In step 404, program code determines data replication instances associated with moving data from a data replication source to a data replication target. A data replication ecosystem may require replication of multiple data sources and therefore each data source is referred to as a data replication instance. Additionally, a first data replication instance for moving data from the data replication source to said data replication target is determined. In step 408, program code determines antenna capacity (for antennas of a wireless system such as 4G LTE) associated with the data replication source and the data replication target based on data received from a data truck. Antenna capacity is defined herein as a physical capability associated with an antenna's ability to transmit split streams. For example, a 4×4 antenna will split data packets into 4 input streams and 4 output streams. Likewise, an 8×8 antenna will split data packets into 8 input streams and 8 output streams. In step 412, program code identifies a transmission mode for the track ID switching system. The transmission mode may be identified as, inter alia, a sequential mode, parallel static mode, a parallel static dynamic mode, etc. In step 414, program code retrieves a memory to track ID map associated with a storage device of the data replication target. In step 418, program code determines (based on the memory to track ID map) if a last replication slot has been allotted to the data replication target. If a last replication slot has not been allotted to the data replication target then in step 418, then step 414 is repeated to retrieve an additional memory to track ID map associated with the storage device. The aforementioned looed is continued until last replication slot has been allotted. If a last replication slot has been allotted to the data replication target then in step 420, program code executes a correctness checking algorithm with respect to the data replication instance and the process is terminated in step 420.

Figure 5:
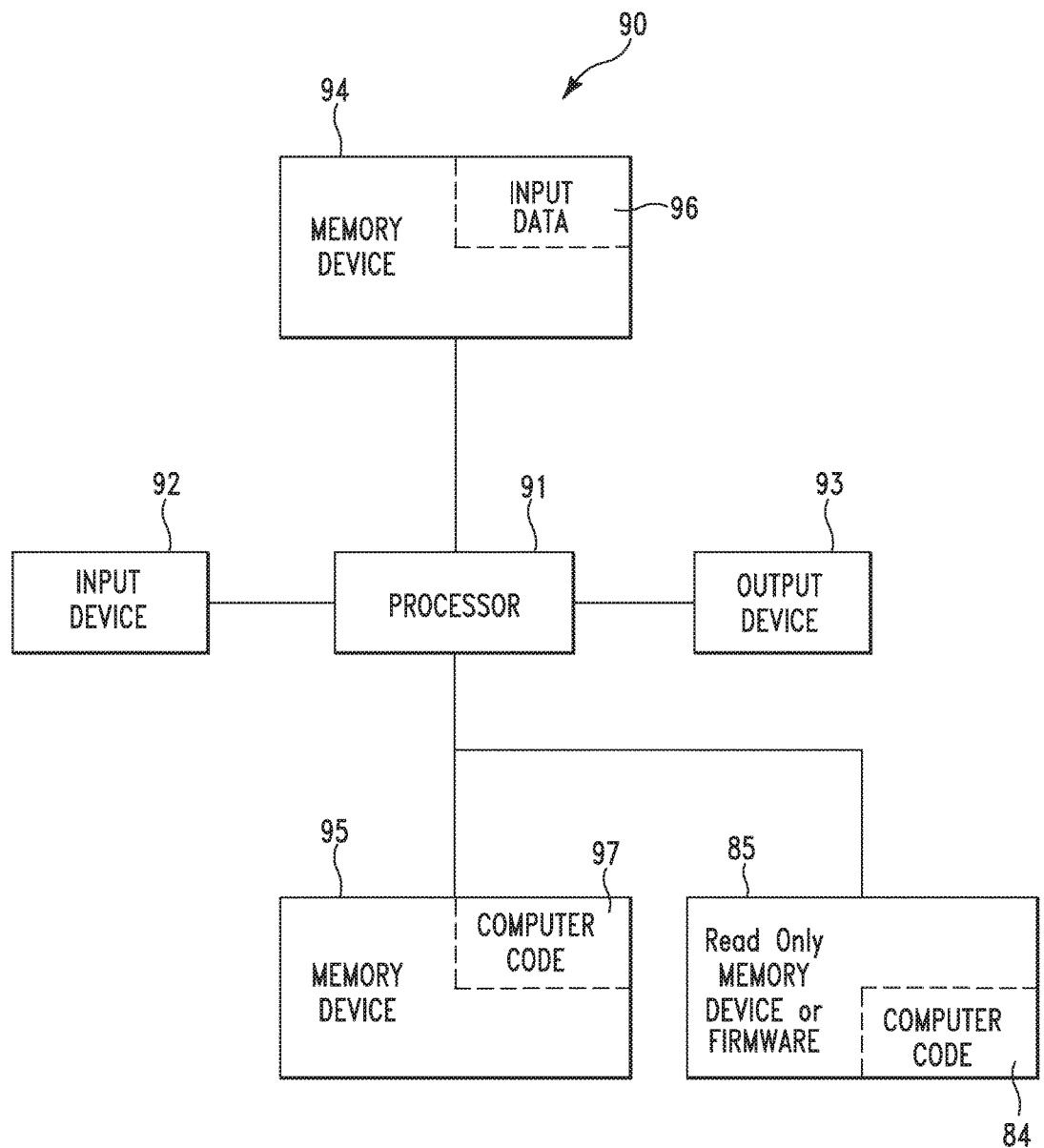
FIG. 5 illustrates a computer apparatus for handling big data volumetrics, in accordance with embodiments of the present invention.

FIG. 5 illustrates a computer apparatus 90 for handling big data volumetrics, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 4) for handling big data volumetrics. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 4) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to handle big data volumetrics. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for handling big data volumetrics. In another embodiment, the invention provides a business method that performs the process steps of the invention on a subscription, advertising, and/or fee basis. That is, a service supplier, such as a Solution Integrator, could offer to handle big data volumetrics. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A memory access speed next generation network technology improvement method comprising:

identifying, by a computer processor of a parallel track/sector switching device associated with big data comprising a graphical user interface (GUI) and a time slot special purpose hardware based switching device, data replication sources, wherein said data replication sources comprise memory device sources;

enabling, by said computer processor, said time slot special purpose hardware based switching device comprising programmable logic circuitry utilizing state information of computer code to customize said programmable logic circuitry for tracking memory device mapping and adjusting associated time slots for physical memory clusters of said data replication sources and data replication targets associated with said data replication sources, wherein said data replication targets comprise memory device targets;

reading, by said computer processor, sector and track identification attributes for populating a memory address and track ID map and executing a memory to track ID hardware mapping device for said memory device targets;

generating, by said computer processor, a memory location switching apparatus table comprising a plurality of rows and a plurality of columns intersecting said plurality of rows, wherein said plurality of rows and said plurality of columns comprise data retrieval speeds with respect to associated memory sections of said memory device targets, wherein said memory location switching apparatus table is configured to enable said memory device targets to retrieve an entire section within specified locations of said memory device targets thereby improving a speed of memory retrieval from said memory device targets;

determining, by said computer processor based on execution of said memory location switching apparatus table, data replication instances associated with moving data from a first data replication source of said data replication sources to a first data replication target of said data replication targets;

determining, by said computer processor, a first data replication instance of said replication instances for moving first data from said first data replication source to said first data replication target;

identifying, by said computer processor based on data from a data truck, antenna capacity associated with said first data replication source and said first data replication target;

retrieving, by said computer processor, a memory to track ID map, of said memory location switching apparatus table, associated with a storage device of said first data replication target;

first determining, by said computer processor based on said memory to track ID map, if a replication slot has been allotted to said first data replication target, wherein results of said first determining indicate that said replication slot has been allotted to said first data replication target, and wherein said method further comprises: executing, by said computer processor, a correctness checking algorithm with respect to said first data replication instance, wherein said correctness checking algorithm comprises a cyclic redundancy check (CRC) error-detecting algorithm for detecting accidental changes to raw data;

transferring, by said computer processor executing said time slot special purpose hardware based switching device, data from said first data replication source of said data replication sources through a wireless connection link to a fiber optic connection link to said first data replication target thereby providing high bandwidth data access speeds at a memory device track and sector level for high speed data transfer for handling data volumes comprising varying velocities; and replicating, based on results of said transferring, disk drive tracks of said first data replication source within said first data replication target.

2. The method of claim 1, wherein results of said first determining indicate that said replication slot has not been allotted to said first data replication target, and wherein said method further comprises:
additionally retrieving, by said computer processor, an additional memory to track ID map associated with said storage device of said first data replication target; and
additionally determining, by said computer processor based on said additional memory to track ID map, if an additional replication slot has been allotted to said first data replication target.

3. The method of claim 1, wherein a transmission mode comprises a sequential data transmission mode.

4. The method of claim 1, wherein a transmission mode comprises a parallel data transmission mode.

5. The method of claim 1, wherein said antenna capacity comprises a physical capacity of an antenna for transmitting split streams.

6. The method of claim 1, wherein said parallel track/sector switching device comprises a next generation (NGN) switching apparatus.

7. The method of claim 1, wherein said parallel track/sector switching device comprises a timeslot based switch including a static mode and a dynamic mode.

8. The method of claim 1, further comprising:
determining, by said computer processor based on said memory to track ID map, memory to track mapping of said storage device; and
adjusting, by said computer processor based on said memory to track mapping, time slots associated with said storage device.

9. The method of claim 1, further comprising:
integrating with said parallel track/sector switching device, by said computer processor, infrastructure discovery software tool; and
depicting, by said computer processor, said first data replication source and said first data replication target within a specified ecosystem.

10. The method of claim 1, further comprising:
enabling by said computer processor, a user to set priorities with respect to said parallel track/sector switching device.

11. The method of claim 1, further comprising:
reading, by said computer processor, sector/track IDs of said first data replication source and said first data replication target; and
populating, by said computer processor, said memory to track ID map with said sector/track IDs.

12. The method of claim 1, further comprising:
triggering, by said computer processor, a data transfer process from said first data replication source to said first data replication target.

13. The method of claim 1, further comprising:
providing at least one support service for at least one of creating, integrating, hosting, maintaining, and deploying computer-readable code in the computing system, said code being executed by the computer processor to implement: said identifying said data replication sources, said determining said data replication instances, said determining said first data replication instance, said identifying said antenna capacity, said retrieving, and said first determining.

14. A parallel track/sector switching device comprising a graphical user interface (GUI), a time slot special purpose hardware based switching device, and a computer processor coupled to a computer-readable memory unit, said computer-readable memory unit comprising instructions that when executed by the computer processor implements a memory access speed next generation network technology improvement method comprising: identifying, by said computer processor of said parallel track/sector switching device, data replication sources, wherein said data replication sources comprise memory device sources;
- enabling, by said computer processor, said time slot special purpose hardware based switching device comprising programmable logic circuitry utilizing state information of computer code to customize said programmable logic circuitry for tracking memory device mapping and adjusting associated time slots for physical memory clusters of said data replication sources and data replication targets associated with said data replication sources, wherein said data replication targets comprise memory device targets;
- reading, by said computer processor, sector and track identification attributes for populating a memory address and track ID map and executing a memory to track ID hardware mapping device for said memory device targets;
- generating, by said computer processor, a memory location switching apparatus table comprising a plurality of rows and a plurality of columns intersecting said plurality of rows, wherein said plurality of rows and said plurality of columns comprise data retrieval speeds with respect to associated memory sections of said memory device targets, wherein said memory location switching apparatus table is configured to enable said memory device targets to retrieve an entire section within specified locations of said memory device targets thereby improving a speed of memory retrieval from said memory device targets;
- determining, by said computer processor based on execution of said memory location switching apparatus table, data replication instances associated with moving data from a first data replication source of said data replication sources to a first data replication target of said data replication targets;
- determining, by said computer processor, a first data replication instance of said replication instances for moving first data from said first data replication source to said first data replication target;
- identifying, by said computer processor based on data from a data truck, antenna capacity associated with said first data replication source and said first data replication target;
- retrieving, by said computer processor, a memory to track ID map, of said memory location switching apparatus table, associated with a storage device of said first data replication target;
- first determining, by said computer processor based on said memory to track ID map, if a replication slot has been allotted to said first data replication target, wherein results of said first determining indicate that said replication slot has been allotted to said first data replication target, and wherein said method further comprises: executing, by said computer processor, a correctness checking algorithm with respect to said first data replication instance, wherein said correctness checking algorithm comprises a cyclic redundancy check (CRC) error-detecting algorithm for detecting accidental changes to raw data;
- transferring, by said computer processor executing said time slot special purpose hardware based switching device, said data from said first data replication source of said data replication sources through a wireless connection link to a fiber optic connection link to said first data replication target thereby providing high bandwidth data access speeds at a memory device track and sector level for high speed data transfer for handling data volumes comprising varying velocities; and
- replicating, based on results of said transferring, disk drive tracks of said first data replication source within said first data replication target.

15. The parallel track/sector switching device of claim 14, wherein results of said first determining indicate that said replication slot has not been allotted to said first data replication target, and wherein said method further comprises:
- additionally retrieving, by said computer processor, an additional memory to track ID map associated with said storage device of said first data replication target; and
- additionally determining, by said computer processor based on said additional memory to track ID map, if an additional replication slot has been allotted to said first data replication target.

16. A computer program product for improving memory access speed next generation network technology for a parallel track/sector switching device comprising a graphical user interface (GUI) and a time slot special purpose hardware based switching device, the computer program product comprising: one or more non-transitory computer-readable, tangible storage devices;
- program instructions, stored on at least one of the one or more non-transitory storage devices, to identify data replication sources of a big data system, wherein said data replication sources comprise memory device sources;
- program instructions, stored on at least one of the one or more non-transitory storage devices, to enable said time slot special purpose hardware based switching device comprising programmable logic circuitry utilizing state information of computer code to customize said programmable logic circuitry for tracking memory device mapping and adjusting associated time slots for physical memory clusters of said data replication sources and data replication targets associated with said data replication sources, wherein said data replication targets comprise memory device targets;
- program instructions, stored on at least one of the one or more non-transitory storage devices, to read sector and track identification attributes for populating a memory address and track ID map and executing a memory to track ID hardware mapping device for said memory device targets;
- program instructions, stored on at least one of the one or more non-transitory storage devices, to generate a memory location switching apparatus table comprising a plurality of rows and a plurality of columns intersecting said plurality of rows, wherein said plurality of rows and said plurality of columns comprise data retrieval speeds with respect to associated memory sections of said memory device targets, wherein said memory location switching apparatus table is configured to enable said memory device targets to retrieve an entire section within specified locations of said memory device targets thereby improving a speed of memory retrieval from said memory device targets;
- program instructions, stored on at least one of the one or more non-transitory storage devices, to determine data replication instances associated with moving data from a first data replication source of said data replication sources to a first data replication target of said data replication targets;

program instructions, stored on at least one of the one or more non-transitory storage devices, to determine, based on execution of said memory location switching apparatus table, a first data replication instance of said replication instances for moving first data from said first data replication source to said first data replication target;

program instructions, stored on at least one of the one or more non-transitory storage devices, to identify based on data from a data truck, antenna capacity associated with said first data replication source and said first data replication target;

program instructions, stored on at least one of the one or more non-transitory storage devices, to identify a transmission mode of said first data replication source;

program instructions, stored on at least one of the one or more non-transitory storage devices, to retrieve a memory to track ID map, of said memory location switching apparatus table, associated with a storage device of said first data replication target;

program instructions, stored on at least one of the one or more non-transitory storage devices, to first determine based on said memory to track ID map, if a last replication slot has been allotted to said first data replication target, wherein results of the said first determining indicate that said last replication slot has been allotted to said first data replication target, and wherein said program instructions further execute a correctness checking algorithm with respect to said first data replication instance, wherein said correctness checking algorithm comprises a cyclic redundancy check (CRC) error-detecting algorithm for detecting accidental changes to raw data;

program instructions, stored on at least one of the one or more non-transitory storage devices, to transfer via execution of executing said time slot special purpose hardware based switching device, said data from said first data replication source of said data replication sources through a wireless connection link to a fiber optic connection link to said first data replication target thereby providing high bandwidth data access speeds at a memory device track and sector level for high speed data transfer for handling data volumes comprising varying velocities; and program instructions, stored on at least one of the one or more non-transitory storage devices, to replicate based on results of transferring said data from said first data replication source to said first data replication target, disk drive tracks of said first data replication source within said first data replication target.

* * * * *